(12) United States Patent
Jain et al.

(10) Patent No.: US 9,176,828 B2
(45) Date of Patent: Nov. 3, 2015

(54) SYSTEM AND METHOD FOR MERGING RESULTS FROM MULTIPLE RUNS BASED ON RUN INPUTS

(71) Applicant: OPSHUB, INC., Palo Alto, CA (US)

(72) Inventors: Sandeep Jain, Palo Alto, CA (US); Hardik Shah, Ahmedabad (IN)

(73) Assignee: OPSHUB, INC., Palo Alto, CA (US)

( * ) Notice: Subject to any disclaimer, the term of this patent is extended or adjusted under 35 U.S.C. 154(b) by 0 days.

(21) Appl. No.: 14/017,235

(22) Filed: Sep. 3, 2013

(65) Prior Publication Data

US 2014/0068564 A1 Mar. 6, 2014

Related U.S. Application Data

(60) Provisional application No. 61/696,440, filed on Sep. 4, 2012.

(51) Int. Cl.
*G06F 9/44* (2006.01)
*G06F 11/14* (2006.01)
*G06F 11/36* (2006.01)
*G06F 11/20* (2006.01)

(52) U.S. Cl.
CPC ........ *G06F 11/1471* (2013.01); *G06F 11/1443* (2013.01); *G06F 11/2079* (2013.01); *G06F 11/2082* (2013.01); *G06F 11/3676* (2013.01)

(58) Field of Classification Search
USPC .................................. 717/123–131, 140–141
IPC ......... G06F 11/3676,11/367, 11/3684, 11/3688, G06F 11/3692, 11/3696, 11/3604, 11/3636, G06F 11/3664, 11/3668
See application file for complete search history.

(56) References Cited

U.S. PATENT DOCUMENTS

| 5,142,681 | A * | 8/1992 | Driscoll et al. | 717/141 |
|---|---|---|---|---|
| 6,427,234 | B1 * | 7/2002 | Chambers et al. | 717/140 |
| 7,174,536 | B1 * | 2/2007 | Kothari et al. | 717/109 |
| 7,398,516 | B2 * | 7/2008 | Berg et al. | 717/126 |
| 7,827,533 | B2 * | 11/2010 | Miyao et al. | 717/126 |
| 7,827,534 | B2 * | 11/2010 | Vetillard et al. | 717/126 |
| 8,191,045 | B2 * | 5/2012 | Sankaranarayanan et al. | 717/124 |
| 8,307,343 | B2 * | 11/2012 | Chaudhuri et al. | 717/128 |
| 8,359,578 | B2 * | 1/2013 | Wang et al. | 717/126 |
| 8,423,770 | B2 * | 4/2013 | Loken | 713/170 |
| 8,479,162 | B2 * | 7/2013 | Li et al. | 717/124 |
| 8,533,669 | B2 * | 9/2013 | King et al. | 717/111 |
| 8,595,685 | B2 * | 11/2013 | Sharma et al. | 717/101 |
| 8,601,441 | B2 * | 12/2013 | Kaulgud et al. | 717/124 |

(Continued)

OTHER PUBLICATIONS

Rubinov, "Generating Integration Test Cases Automatically", ACM, pp. 357-360, 2010.*

(Continued)

*Primary Examiner* — Anil Khatri
(74) *Attorney, Agent, or Firm* — Barry Choobin; Patent360 LLC

(57) ABSTRACT

The embodiments herein disclose a method for merging results from multiple runs based on run inputs in a source system. The method involves performing first run on a first input, to receive a first result and performing a second run on a second input to receive a second result. The first result and second result are aggregated based on a set of rules and a plurality of merge cases/conditions to obtain a final result. The first run is performed by carrying out a static analysis on the first inputs. The second run is performed by carrying out a static analysis on the second inputs. A method is also provided for merging cobertura coverage and a source code.

14 Claims, 3 Drawing Sheets

(56) References Cited

U.S. PATENT DOCUMENTS

| | | | |
|---|---|---|---|
| 8,776,007 B2* | 7/2014 | Bijani et al. | 717/100 |
| 8,806,441 B2* | 8/2014 | Chandra et al. | 717/126 |
| 8,813,033 B2* | 8/2014 | Sreedhar | 717/124 |
| 8,904,357 B2* | 12/2014 | Eade et al. | 717/125 |

OTHER PUBLICATIONS

Shoham et al, "Static Specification Mining Using Automata-Based Abstractions", ACM, pp. 174-184, 2007.*

Ware et al, "Securing Java Code: Heuristics and an Evaluation of Static Analysis Tools", ACM, pp. 12-21, 2008.*

Robillard et al, "Static Analysis to Support the Evolution of Exception Structure in Object-Oriented Systems", ACM Transactions on Software Engineering and Methodology, vol. 12, No. 2, pp. 191-221, 2003.*

Ayewah et al, "Using Checklists to Review Static Analysis Warnings", ACM, pp. 11-15, 2009.*

Zheng et al, "On the Value of Static Analysis for Fault Detection in Software", IEEE Transactions on Software Engineering, vol. 32, No. 4, pp. 240-253, 2006.*

* cited by examiner

SYSTEM AND METHOD FOR MERGING RESULTS FROM MULTIPLE RUNS BASED ON RUN INPUTS

CROSS-REFERENCE TO RELATED APPLICATION

This application claims the priority of the U.S. Provisional patent application (PPA) with Ser. No. 61/696,440 filed on Sep. 4, 2012 and the contents of which is incorporated in entirety herein.

BACKGROUND

1. Technical Field

The embodiments herein generally relate to a merging of results data. The embodiments herein particularly relate to the merging of results from multiple runs based on run inputs that are mutually different from one run to another. The embodiments herein more particularly relate to a method and system for merging results which cannot be simply combined and need to be intelligently aggregated.

2. Description of the Related Art

There are many definitions for merge. All of them disclose the merging of the results of two or more sorted input files and combining the results into an aggregate or single output result. Normally, when a data step merges two data sets, any common variables will have the same length in both sources of data. When a variable has different lengths in the incoming data sets, and when that variable is also a by variable, the merge can produce truly bizarre results. The currently available technique for merging includes a match merging, code merging, one-to-one merge, one-to many merge and matching using characteristics, history, length and types. Sometimes the results are merged using SQL. But each of these merging techniques has an inherent problem that in certain situations they will not produce proper aggregated results e.g. combining the results of two code coverage runs where the underlying source files changed between runs.

Normally, in a testing cycle, there is a possibility that whole testing is not completed on one deployment. So it is possible that some code is tested on "Deployment run 1" and some other code is tested on "Deployment run 2". "Deployment run 2" may cover some already tested code of "Deployment run 1" and as well as it may cover some new code during the testing. In such cases, there would be two deployment runs and there would be a coverage information of two individual different runs. Hence it is difficult to take analytical judgement as it is required to navigate both reports and then only, one can take appropriate conclusion for coverage testing. Hence, there is a need for a merge algorithm for merging two individual runs to produce single coverage report so that, a proper judgment is taken on viewing the single coverage report. Also, during a merging of code, there is a big challenge of code consistency like it may be possible that code of class X is different in both deployments.

Hence there is a need for a method and system for merging the results from multiple runs based on run inputs during integration. There is also a need for a method and system for performing a continuous integration of results, by providing an algorithm to merge results from multiple runs based on run inputs during integration. Further, there is also a need for a merge algorithm for merging two individual runs and produce single coverage report and also maintain code consistency.

The abovementioned shortcomings, disadvantages and problems are addressed herein and which will be understood by reading and studying the following specification.

OBJECT OF THE EMBODIMENTS

The primary object of the embodiments herein is to provide a method and system for merging results from multiple runs based on run inputs during integration.

Another object of the embodiments herein is to provide a method for a three way merge of code coverage using an algorithm.

Yet another object of the embodiments herein is to provide a method for a line merge using an algorithm and a source code.

Yet another object of the embodiments herein is to provide a method for merging results in different branch scenarios.

Yet another object of the embodiments herein is to provide a merge algorithm for merging two individual runs and producing a single aggregate merge coverage report.

These and other objects and advantages of the embodiments herein will become readily apparent from the following detailed description taken in conjunction with the accompanying drawings.

SUMMARY

The various embodiments herein provide a method for merging results from multiple runs based on run inputs in a source system. The method comprises performing a first run on a first input to receive a first result, performing a second run on a second input to receive a second result, aggregating the first result and second result based on a set of rules and a plurality of merge scenarios to obtain a final result.

According to an embodiment herein, the first input and the second input are selected from a group consisting of class, code, branch and line.

According to an embodiment herein, the first input and the second input comprises a set of variables. According to an embodiment herein, the set of variables in the first input and the set of variables in the second input overlap with each other. According to an embodiment herein, the set of variables in the first input and the set of variables in the second input are mutually different.

According to an embodiment herein, the first run is performed by carrying out a static analysis on the first inputs and wherein the second run is performed by carrying out a static analysis on the second inputs.

According to an embodiment herein, the aggregate merge result of a plurality of runs is a sum of a plurality of individual run results of the plurality of runs, when a set of variables in a plurality of inputs used in the plurality of inputs do not overlap with one another.

According to an embodiment herein, the aggregate merge result of a plurality of runs is acquired based on a plurality of merge rules, when a set of variables in a plurality of inputs are mutually different.

According to an embodiment herein, the aggregate merge result is obtained by summing up a line hit or coverage in a merge report, when a line is covered in both in the first run and in the second run.

According to an embodiment herein, the aggregate merge result is obtained by covering a line in the merge report, when a line is covered in the first run and the same line is not covered in second run.

According to an embodiment herein, the aggregate merge result is obtained by deleting a line that is not covered in both the first run and the second run and by covering all other lines, when a line is present and covered in the first run and the same line is deleted in the second run and is not covered in the second run.

According to an embodiment herein, the aggregate merge result is obtained by merging the results of the first run and the result of the second run, when a branch is hit in the first run and in the second run in mutually different cases.

The various embodiments herein provide a method for merging cobertura coverage and a source code. The same method can be applied to merging output from other similar tools. The method comprising the steps of taking a class code of coverage run 1, taking a class code of coverage run 2, comparing the class code of coverage run 1 and the class code of coverage run 2 to check whether a code is changed for the current class for run 1 and run 2, and computing a difference of code. When a code is changed, then mapping a old line number to a new line number, or else passing the old line number and new line number directly to a merge algorithm and merging a line and branch coverage information. The merging of the line and branch coverage information comprises summing up old code line hits and new code line hits, and checking whether either one of a old code line/branch or a new code line/branch is covered in testing, and then marking a code line as covered.

The various embodiments herein provide a computer storage medium recorded with instructions that are run on a processor of computing device to perform a method comprising the steps of performing a first run on a first input to receive a first result, performing a second run on a second input to receive a second result, and aggregating the first result and second result based on a set of rules and a plurality of merge scenarios to obtain a final result.

According to an embodiment herein, the first input and the second input are selected from a group consisting of class, code, branch and line.

According to an embodiment herein, the first input and the second input comprises a set of variables. According to an embodiment herein, the set of variables in the first input and the set of variables in the second input overlap with each other. According to an embodiment herein, the set of variables in the first input and the set of variables in the second input are mutually different.

According to an embodiment herein, the first run is performed by carrying out a static analysis on the first inputs and wherein the second run is performed by carrying out a static analysis on the second inputs.

According to an embodiment herein, the aggregate merge result of a plurality of runs is a sum of a plurality of individual run results of the plurality of runs, when a set of variables in a plurality of inputs used in the plurality of inputs do not overlap with one another. The aggregate merge result of a plurality of runs is acquired based on a plurality of merge rules, when a set of variables in a plurality of inputs are mutually different.

According to an embodiment herein, a plurality of merge scenarios are provided. In case, when a line is not changed between the two runs, then the aggregate coverage in merge report is the sum of the two coverage runs. When the source line has been modified or deleted in the newer run, then the aggregate coverage in the merge report is the coverage in the newer run. Similarly, a branch coverage is aggregated by factoring in which branches have remained same and which have been changed or modified. The merge report is then considered as an aggregate code coverage report for the two runs as of the source code version of the latest run.

According to an embodiment herein, a method is provided for further merging additional runs into the merged report and a corresponding source version becoming the initial input to the merge algorithm.

According to one embodiment herein, a method is provided for a three way merge of code coverage using an algorithm to merge coverage reports resulting in an evolution of a source code. The method comprising the steps of taking a class code of coverage run 1, taking a class code of coverage run 2, comparing the class code of coverage run 1 and the class code of coverage run 2, checking whether the code is changed for the current class for run 1 and run 2, computing a difference of codes, when a code is changed, mapping a old line number to a new line number, or else passing the old line numbers and the new line numbers directly to a merge algorithm, and merging a line and a branch coverage information. Wherein the merging of the line and branch coverage information comprising the steps of summing up the old code line hits and the new code line hits, and checking whether either one of the old code line/branch or new code line/branch is covered in a testing, and then marking a code line as covered.

According to an embodiment herein, a merge algorithm for merging the two individual runs and producing a single coverage report comprises the steps of: iterating code coverage information for classes which are covered in "Deployment run 1", finding relevant classes for code coverage information of "Deployment run 2" and merging "Deployment run 1" and "Deployment run 2".

According to an embodiment herein, the merge algorithm further comprises checking if the same class in two different runs is changed or not, and if found that the same class in two different runs is changed, then comparison in done for that and line number of "Deployment run 1" is mapped to the line number of "Deployment run 2". Further, code coverage information for those all line numbers are got. Similarly, if there is no change in the same class for two different runs, then code coverage information is got directly for all lines for both run's class.

According to an embodiment herein, in merge algorithm, once a line coverage information is retrieved for both the runs of the class, then the line hits of "Deployment run 1" and "Deployment run 2" are summed up for the relevant mapped class. The summing up of the line hits provides the total line hits in the merged coverage report. Further, it is checked to find if either one of "Deployment run 1" or "Deployment run 2" has been covered the line/branch, if yes, then that line/branch is mark as covered.

According to an embodiment herein, in merge algorithm, if in one run branch is hit in different case and in other run the same branch is hit in a different case, then results of those runs are merged in the merge report. For example in "if/else" branch: if in first run, "if" part is covered and in second run "else" part is covered, then, in merge report, consider or ensure that both the "if/else" branches are covered. The above example is for "if/else" branch case, the same is applicable in "for branch" case accordingly. Similarly, in "switch" branch cases, it is handled differently. In "switch branch" case, if the class code is not changed between the two different runs, then it is merged in the same way as mentioned above. But if source code is changed between the two different runs, then only a newly run "switch" branch case coverage is considered and reported in the merge report.

According to an embodiment herein, a merge algorithm for merging two individual runs and producing a single coverage report comprises rules such as, a) the line hits in the merge report is the sum of the line hits for coverage run 1 and coverage run 2; b) if a line is covered in either of the one run, then the line is considered as covered in final merge report; c) if some lines are deleted in the newer run 2 which was covered in the older run 1, then those lines are skipped in the final merge report, since the final merge report is based on the newer run code; d) if some lines are newly added in the newer run 2 and those lines are not present in the older run 1, then the coverage for those lines are taken from the newer run 2 only; and d) in case of branch coverage, if some types of conditions are covered in the coverage run 1 and some are covered in the coverage run 2, then those conditions are merged also. (This type of result is applicable for "if" and "for" branch case. While in "Switch" branch case, this is applicable partially like if the class code is not changed between the old run and the new run, then it will be merged by the same way as adopted for the "if" and "for" branch cases. But, if a source code is changed between the old and the new run, then only the newer run switch branch case coverage is taken care.)

According to an embodiment herein, an algorithm to merge cobertura coverage is provided. First a pattern is studied, and the xml file is generated in alphabetical sequence which gives us the chance to read the xml nodes from both the streams, in parallel. The source code is existed at both points in time. The source code exists, when a code-coverage is base-lined and when a code is compared to current build and is merged. Also a code-refactor is not determined, when a class or package is refactored and the code-coverage is marked as zero.

According to an embodiment herein, an algorithm to merge cobertura coverage comprises the steps of: The first step of the algorithm comprises opening the stream to base-line xml coverage with variable Baslined XML Coverage Result (BLX), opening the stream to current XML with variable Current XML Coverage Result (CX) and Initializing a stream, where one needs to write final merged XML results. The second step comprises iterating through all packages in both BLX and CX. When a package exists in BLX and not in CX, then the whole package is deleted. Hence the old code coverage is irrelevant in the final output, as the code does not exist at all and the package is skipped. Similarly, when a package exists in CX and not in BLX, then the package is newly added and the code exists. When there is any coverage that is taken place only as a part of current package, the whole package as in CX is taken or considered. The third step comprises handling the package in CX and BLX, when a package exists in both CX and BLX. The classes are stored in alphabetical order. So a merging of code classes is done by one-by-one and a code is iterated through each class within the package. With respect to third step, when a package exists in both CX and BLX, then a merging of code is handled. When a class exists in BLX and not in CX, then the cobertura coverage is skipped and is not merged. Further the cobertura coverage is not merged in the final report. When the class does not exist currently, so the code-coverage is lost and the class is not included in the final report. Further the class is not merged in final result. When a class exists in CX and not in BLX, then merge the cobertura coverage as it is in the current state (the class is in current, and not in base-lined, thereby indicating that the class is a newly added class), or else a New Line Finder is initialized to fetch a new line number, in case of providing the old file/new file text, Old Source Path, and New Source Path. The methods within the class are iterated through. With respect to third step for Handle Methods, in case the method exists in BLX and not in CX then it is assumed that the method does not exist currently and hence the method is skipped and the class is not merged in final result. Thus the code-coverage is lost as per current state, and the class need not be merged in final report. On the other hand when the method exists in CX and not in BLX then (the method did not exist previously), merge the coverage as it is in the current state, else take each line find its <new Line Number> using the Line Finder Utility (means it does not exist in new Code).

```
if <new Line Number> returned is –I
    Don't merge it in new RX (Result XML)
else if <new Line Number> is non Zero
```

Take line Number element from CX and sum-up the values for total coverage for that line. Now, take all new Line Numbers, which are not already merged, and merge them as is in RX. With respect to third step for Handle Lines Report, repeat in step previous step (With respect to third step for Handle Methods) for all line numbers within the <lines> tag as well.

According to one embodiment herein, the method further comprises a three way merge of code coverage result in context of source code evolution. The three way merge of code coverage result is as follows;

```
Get the patch information from Diff utility between 2 files
    for (Delta delta: patch.getDeltas( )) { isCodeChange = true;
        int revisedPos = delta.getRevised( ).getPosition( );
        int revisedSize = delta.getRevised( ).size( );
        List<?> revisedLines = delta.getRevised( ).getLines( );
        int originalSize = delta.getOriginal( ).size( );
        List<?> originalLines = delta.getOriginal( ).getLines( );
        If (revisedPos>=newLineCurr){int i=newLineCurr;
        for (;i<=revisedPos;i++) { setSimilarLineNumbers( );}}
        if (revised Size<original Size){int cnt=0; for (Object line : original Lines {if (revised
Size > cnt && line.toString( ).trim ( ).equals (revised Lines. Get (cnt). To String ( ). trim ( )))
{set Similar Line Numbers( );}
            else {if (revised Size>cnt) {set Insert Line Numbers( );} set Delete Line Numbers( );}
cnt++;}}
            orelse if (revised Size > original Size) {int cnt=0; for (Object line : revised Lines)
{if(original Size > cnt && line. to String ( ).trim ( ). Equals (original Lines. Get (cnt).to
String ( ).trim ( ))) {set Similar Line Numbers ( );}
                else{setInsertLineNumbers( );if(originalSize>cnt){setDeleteLineNumbers( );}}cnt++;}}
        else{int cnt=0; for(Object line : revised Lines) {if (line.toString( ).trim( ).Equals (original
Lines. get(cnt).to String( ). trim( ) )) {set Similar Line Numbers( );} else{ set Insert Line
Numbers ( ); set Delete Line Numbers( );} cnt++;}}}
Wherein:
        Set Similar Line Numbers - it just puts the map based on current new line point and
        old Line pointer, and increments both line numbers.
        Set Insert Line Numbers - it just puts the –1 in old current in new, increments current
``` line number.
Set Delete Line Numbers - it just puts the −1 in new current Old Pointer in old, increments current Old Line number.

BRIEF DESCRIPTION OF THE DRAWINGS

The other objects, features and advantages will occur to those skilled in the art from the following description of the preferred embodiment and the accompanying drawings in which.

Figure 1:
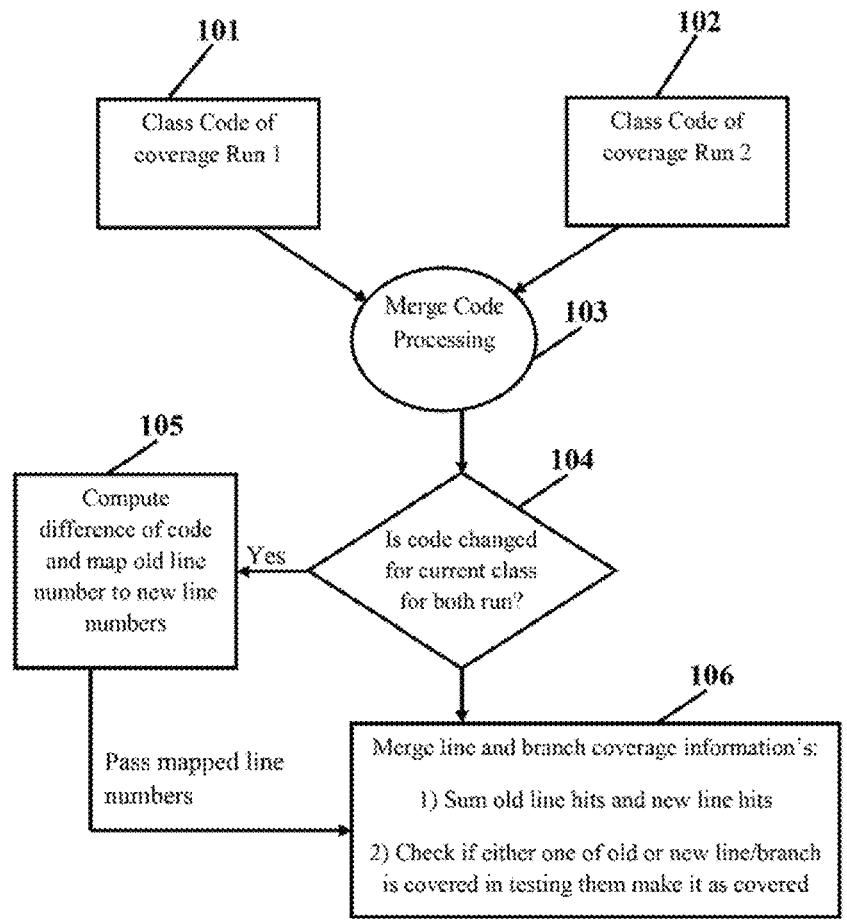
FIG. 1 illustrates a flow chart indicating a method of executing an algorithm for merging cobertura coverage, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for merging the results from multiple runs based on run inputs in a source system. The method comprises performing a first run on a first input to receive a first result, performing a second run on a second input to receive a second result, aggregating the first result and second result based on a set of rules and a plurality of merge scenarios to obtain a final result.

According to an embodiment herein, the first input and the second input are selected from a group consisting of class, code, branch and line.

According to an embodiment herein, the first input and the second input comprises a set of variables.

According to an embodiment herein, the set of variables in the first input and the set of variables in the second input overlap with each other.

According to an embodiment herein, the set of variables in the first input and the set of variables in the second input are mutually different.

According to an embodiment herein, the first run is performed by carrying out a static analysis on the first inputs and wherein the second run is performed by carrying out a static analysis on the second inputs.

According to an embodiment herein, the aggregate merge result of a plurality of runs is a sum of a plurality of individual run results of the plurality of runs, when a set of variables in a plurality of inputs used in the plurality of inputs do not overlap with one another.

According to an embodiment herein, the aggregate merge result of a plurality of runs is acquired based on a plurality of merge rules, when a set of variables in a plurality of inputs are mutually different.

According to an embodiment herein, the aggregate merge result is obtained by summing up a line hit or coverage in a merge report, when a line is covered in both in the first run and in the second run.

According to an embodiment herein, the aggregate merge result is obtained by covering a line in the merge report, when a line is covered in the first run and the same line is not covered in second run.

According to an embodiment herein, the aggregate merge result is obtained by deleting a line that is not covered in both the first run and the second run and by covering all other lines, when a line is present and covered in the first run and the same line is deleted in the second run and is not covered in the second run.

According to an embodiment herein, the aggregate merge result is obtained by merging the results of the first run and the result of the second run, when a branch is hit in the first run and in the second run in mutually different cases.

The various embodiments herein provide a method for merging cobertura coverage and a source code. The method comprising the steps of taking a class code of coverage run 1, taking a class code of coverage run 2, comparing the class code of coverage run 1 and the class code of coverage run 2 to check whether a code is changed for the current class for run 1 and run 2, and computing a difference of code. When a code is changed, then mapping a old line number to a new line number, or else passing the old line number and new line number directly to a merge algorithm and merging the line and branch coverage information. The merging of the line and branch coverage information comprises summing up the code line hits and the new code line hits, and checking whether either one of a old code line/branch or a new code line/branch is covered in a testing, and then marking a code line as covered.

The various embodiments herein provide a computer storage medium recorded with instructions that are run on a processor of computing device to perform a method comprising the steps of performing a first run on a first input to receive a first result, performing a second run on a second input to receive a second result, and aggregating the first result and second result based on a set of rules and a plurality of merge scenarios to obtain a final result.

According to an embodiment herein, the first input and the second input are selected from a group consisting of class, code, branch and line.

According to an embodiment herein, the first input and the second input comprises a set of variables.

According to an embodiment herein, the set of variables in the first input and the set of variables in the second input overlap with each other. According to an embodiment herein, the set of variables in the first input and the set of variables in the second input are mutually different.

According to an embodiment herein, the first run is performed by carrying out a static analysis on the first inputs and wherein the second run is performed by carrying out a static analysis on the second inputs.

According to an embodiment herein, the aggregate merge result of a plurality of runs is a sum of a plurality of individual run results of the plurality of runs, when a set of variables in a plurality of inputs used in the plurality of inputs do not overlap with one another. The aggregate merge result of a plurality of runs is acquired based on a plurality of merge rules, when a set of variables in a plurality of inputs are mutually different.

According to an embodiment herein, a plurality of merge scenarios are provided. In case, when a line is not changed between the two runs, then the aggregate coverage in merge report is the sum of the two coverage runs. When the source line has been modified or deleted in the newer run, then the aggregate coverage in the merge report is the coverage in the newer run. Similarly, branch coverage is aggregated by factoring in which branches have remained same and which have been changed or modified. The merge report is then considered as an aggregate code coverage report for the two runs as of the source code version of the latest run.

According to an embodiment herein, a method is provided for further merging additional runs into the merged report and a corresponding source version becoming the initial input to the merge algorithm.

According to one embodiment herein, a method is provided for a three way merge of code coverage using an algorithm to merge cobertura coverage reports resulting in an evolution of a source code. The method comprising the steps of taking a class code of coverage run 1, taking class code of coverage run 2, comparing the class code of coverage run 1 and the class code of coverage run 2, checking whether a code is changed for the current class for run 1 and run 2, computing a difference of codes, when a code is changed, mapping a old line number to a new line number, or else passing the old line numbers and the new line numbers directly to a merge algorithm, and merging the line and branch coverage information. Wherein the merging of the line and branch coverage information comprising the steps of summing up the old code line hits and the new code line hits, and checking whether either one of the old code line/branch or new code line/branch is covered in a testing, and then marking a code line as covered.

According to an embodiment herein, a merge algorithm for merging two individual runs and producing a single coverage report comprises the steps of: iterating a code coverage information for the classes which are covered in "Deployment run 1", finding the relevant classes for code coverage information of "Deployment run 2" and merging "Deployment run 1" and "Deployment run 2".

According to an embodiment herein, the merge algorithm further comprises checking if the same class in two different runs is changed or not, and if found that the same class in two different runs is changed, then a comparison of the same classes in two different runs is done and a line number of "Deployment run 1" is mapped to the line number of "Deployment run 2". Further, the code coverage information for those all line numbers are got. Similarly, if there is no change in the same class for two different runs, then the code coverage information is got directly for all the lines for both run's class.

According to an embodiment herein, in merge algorithm, once a line coverage information is retrieved for both the runs of the class, then the line hits of "Deployment run 1" and "Deployment run 2" are summed up for the relevant mapped class. The summing up of the line hits provides the total line hits in the merged coverage report. Further, it is checked if either one of "Deployment run 1" or "Deployment run 2" has been covered the line/branch. If it is found yes, then that line/branch is mark as covered.

According to an embodiment herein, in merge algorithm, if in one run branch is hit in different case and in other run the same branch is hit in different case, then those runs are merged in the merge report. For example in "if/else" branch: if in first run, "if" part is covered and in second run, "else" part is covered then in the merge report consider that the both "if/else" branch as covered. The above example is for "if/else" branch case, and the same is applicable in "for branch" case accordingly. Similarly, in "switch" branch cases, it is handled differently. In "switch branch" case, if the class code is not changed between the two different runs, then it is merged in the same way as mentioned above. But if source code is changed between the two different runs, then only the newly run "switch" branch case coverage is considered and reported in the merge report.

FIG. 1 illustrates a flow chart indicating a method of using an algorithm to merge cobertura coverage, according to an embodiment herein. The algorithm for merging cobertura coverage comprises the steps of: taking a class code of coverage run 1 (101) and class code of coverage run 2 (102); merge a code processing by comparing the class code of coverage run 1 and the class code of coverage run 2 (103) and checking weather a code is changed for the current class for both runs (104); computing a difference of code, if code is changed and mapping a old line number to a new line numbers (105), or else passing those line numbers directly to a merge algorithm; and merging the line and branch coverage information comprising by summing up the old code line hits and new code line hits, and checking if either one of the old code line/branch or new code line/branch is covered in the testing, and then marking it as covered (106).

According to an embodiment herein, when a line is covered in both the old and new run, then the line hit or coverage is summed up in merge report.

| | | Old run |
|---|---|---|
| 5 | | public void printoutput1(boolean flag){ |
| 6 | 1 | System.out.println("Outer Line 1"); |
| 7 | 1 | System.out.println("Outer Line 2"); |
| | | New run |
| 5 | | public void printoutput1(boolean flag){ |
| 6 | 1 | System.out.println("Outer Line 1"); |
| 7 | 1 | System.out.println("Outer Line 2"); |
| | | Merge Report |
| 5 | | public void printoutput1(boolean flag){ |
| 6 | 2 | System.out.println("Outer Line 1"); |
| 7 | 2 | System.out.println("Outer Line 2"); |

According to an embodiment herein, when a line is covered in old run and the same line is not covered in new run, then it is shown covered in merge report.

| | | Old Run |
|---|---|---|
| 9 | 1 | if(flag){ |
| 10 | 1 | System.out.println("Dynamic Inner Line 1"); |
| 11 | 1 | System.out.println("Dynamic Inner Line 2"); |
| 12 | | } |
| | | New Run |
| 9 | 1 | if(flag){ |
| 10 | 0 | System.out.println("Dynamic Inner Line 1"); |
| 11 | 0 | System.out.println("Dynamic Inner Line 2"); |
| 12 | | } |
| | | Merge Report |

-continued

| | | |
|---|---|---|
| 9 | 2 | if(flag){ |
| 10 | 1 | System.out.println("Dynamic Inner Line 1"); |
| 11 | 1 | System.out.println("Dynamic Inner Line 2"); |
| 12 | | } |

According to an embodiment herein, when some line is present in the old run and it is covered and same line are deleted in the new run and it not covered in that run, then those line are also deleted in merge report and all the other line in that branch is shown covered once.

Old Run

| | | |
|---|---|---|
| 15 | | public void printoutput2(boolean flag){ |
| 16 | 1 | System.out.println("Outer Line 1"); |
| 17 | 1 | System.out.println("Outer Line 2"); |
| 18 | 1 | System.out.println("Outer Line 3"); |
| 19 | 1 | System.out.println("Outer Line 4"); |
| 20 | 1 | System.out.println("Outer Line 5"); |
| 21 | 1 | System.out.println("Outer Line 6"); |
| 22 | 1 | System.out.println("Outer Line 7"); |
| 23 | 1 | System.out.println("Outer Line 8"); |
| 24 | | |
| 25 | 1 | if(flag){ |
| 26 | 1 | System.out.println("Dynamic Inner Line 1"); |
| 27 | 1 | System.out.println("Dynamic Inner Line 2"); |
| 28 | | } |
| 29 | 1 | } |

New Run

| | | |
|---|---|---|
| 15 | | public void printoutput2(boolean flag){ |
| 16 | 0 | System.out.println("Outer Line 1"); |
| 17 | 0 | System.out.println("Outer Line 2"); |
| 18 | 0 | System.out.println("Outer Line 3"); |
| 19 | 0 | System.out.println("Outer Line 6"); |
| 20 | 0 | System.out.println("Outer Line 7"); |
| 21 | 0 | System.out.println("Outer Line 8"); |
| 22 | | |
| 23 | 0 | if(flag==true){ |
| 24 | 0 | System.out.println("Dynamic Inner Line 1"); |
| 25 | 0 | System.out.println("Dynamic Inner Line 2"); |
| 26 | | } |
| 27 | 0 | } |

Merge Report

| | | |
|---|---|---|
| 15 | | public void printoutput2(boolean flag){ |
| 16 | 1 | System.out.println("Outer Line 1"); |
| 17 | 1 | System.out.println("Outer Line 2"); |
| 18 | 1 | System.out.println("Outer Line 3"); |
| 19 | 1 | System.out.println("Outer Line 6"); |
| 20 | 1 | System.out.println("Outer Line 7"); |
| 21 | 1 | System.out.println("Outer Line 8"); |
| 22 | | |
| 23 | 0 | if(flag==true){ |
| 24 | 1 | System.out.println("Dynamic Inner Line 1"); |
| 25 | 1 | System.out.println("Dynamic Inner Line 2"); |
| 26 | | } |
| 27 | 1 | } |

According to an embodiment herein, if in old run, a branch is hit in different case and the same branch is hit in different case in the new run, then those branches are merged in the merge report. In the under mentioned example in old run, a flag variable has a value "true", while in new run, the flag variable has a value "false" and those will be merged accordingly.

Old Run

| | | |
|---|---|---|
| 7 | 1 | boolean flag=true; |
| 8 | | |
| 9 | 1 | System.out.println("Outer Line 1"); |
| 10 | 1 | System.out.println("Outer Line 2"); |
| 11 | | |
| 12 | 1 | if(flag){ |
| 13 | 1 | System.out.println("Dynamic Inner Line 1"); |
| 14 | 1 | System.out.println("Dynamic Inner Line 2"); |
| 15 | | } |

New Run

| | | |
|---|---|---|
| 7 | 1 | boolean flag=false; |
| 8 | | |
| 9 | 1 | System.out.println("Outer Line 1"); |
| 10 | | |
| 11 | 1 | if(flag){ |
| 12 | 0 | System.out.println("Dynamic Inner Line 1"); |
| 13 | 0 | System.out.println("Dynamic Inner Line 2"); |
| 14 | | } |

Merge Report

| | | |
|---|---|---|
| 7 | 1 | boolean flag=false; |
| 8 | | |
| 9 | 2 | System.out.println("Outer Line 1"); |
| 10 | | |
| 11 | 2 | if(flag){ |
| 12 | 1 | System.out.println("Dynamic Inner Line 1"); |
| 13 | 1 | System.out.println("Dynamic Inner Line 2"); |
| 14 | | } |

The abovementioned example is an example of "if branch case", and the same will be applicable in for other branch cases. The "switch branch cases" are handled differently. In "switch branch case", if the class code is not changed between the old run and the new run, then it will be merged the same way like we had seen in previous example, and if the source code is changed between the old run and the new run, then only a newer run switch branch case coverage is taken care.

According to one embodiment of the present invention, a static analysis is run on a set of source files using one set of rules. Then the static analysis is re-run on the set of source files using another set of rules. The results of both the static analysis are aggregated to obtain a final result.

According to an embodiment herein, when the inputs have overlap conditions or rules, then the inputs which overlap are individually subjected to static analysis to obtain the respective results. Then the results of the analysis are merged based on preset rules and merge scenarios to obtain the final result such that there is no overlap.

According to an embodiment herein, a merge algorithm for merging two individual runs to produce a single coverage report comprises rules such as, a) the line hits in the merge report is the sum of the line hits for coverage run 1 and coverage run 2; b) if a line is covered in either of the one run, then the line is considered as covered in final merge report; c) if some lines are deleted in the newer run 2 which was covered in the older run 1, then those lines are skipped in the final merge report, since the final merge report is based on the newer run code; d) if some lines are newly added in the newer run 2 and those lines are not present in the older run 1, then the coverage for those lines are taken from the newer run 2 only; and d) in case of branch coverage, if some type of conditions is covered in the coverage run 1 and some are covered in the coverage run 2, then those conditions are merged also. (This type of result is applicable for "if" and "for" branch case. While in "Switch" branch case, this is applicable partially like if the class code is not changed between the old run and the new run, then it will be merged by the same way as adopted for the "if" and "for" branch cases. But, if source code is changed between the old and the new run, then only the newer run switch branch case coverage is taken care).

Figure 2A:
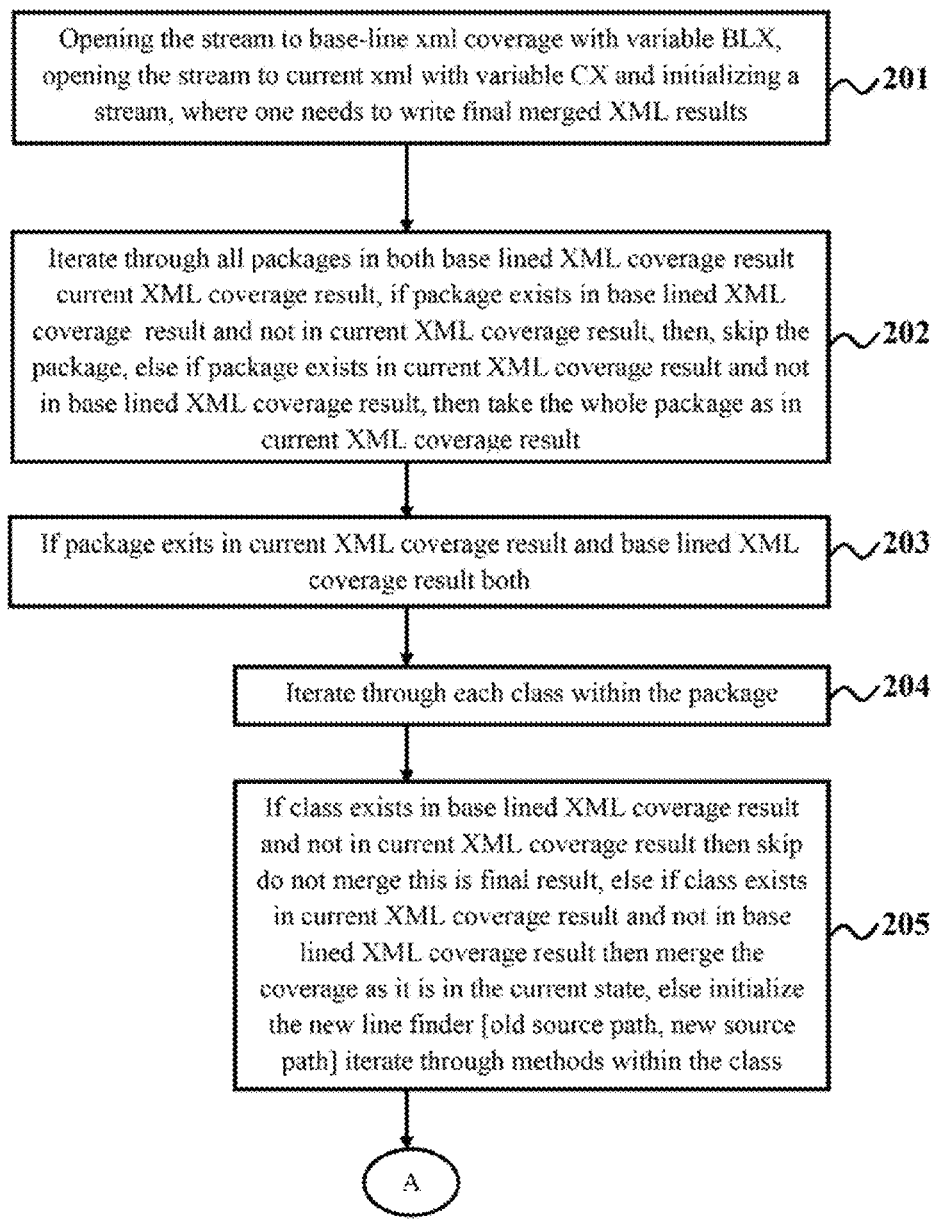
FIG. 2a and FIG. 2b jointly illustrates a flow chart explaining a method of executing an algorithm to merge results from multiple runs based on run inputs by generating an xml file in an alphabetical sequence, according to an embodiment herein.
Figure 2B:
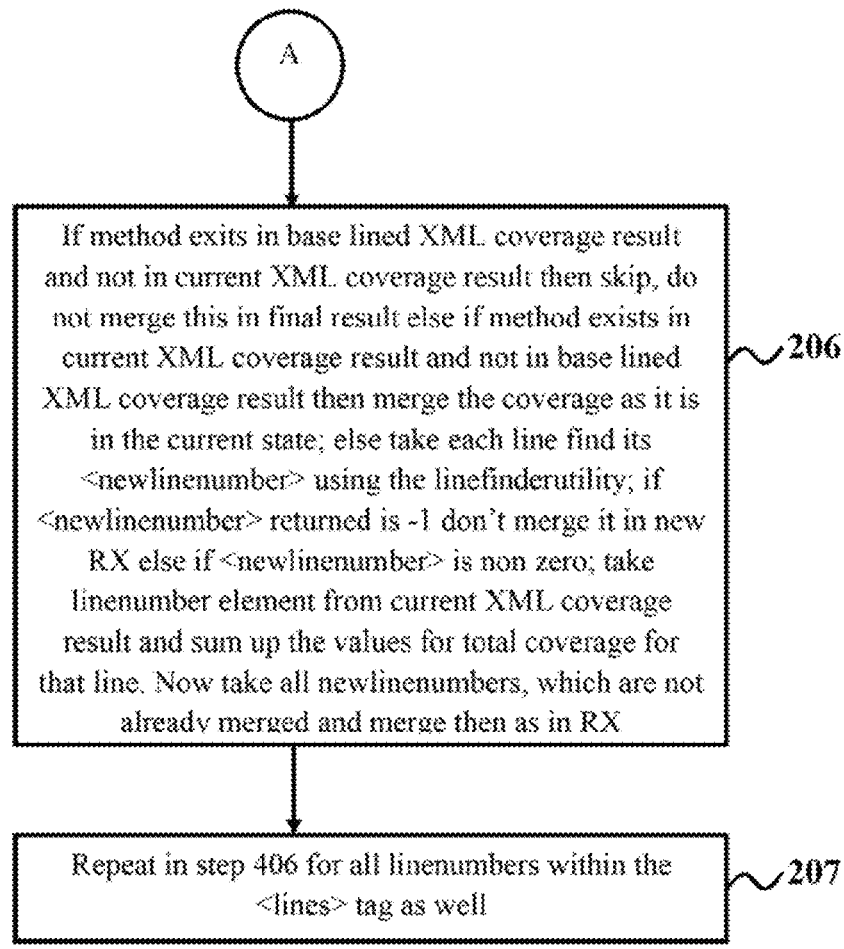

FIG. 2a and FIG. 2b jointly illustrates a flow chart explaining a method of executing an algorithm to merge results from multiple runs based on run inputs by generating an xml file in an alphabetical sequence, according to an embodiment herein. Consider that the pattern is studied, and the xml file is generated in alphabetical sequence which allows reading the xml nodes from both the streams, in parallel. Also consider that the source code is existed at both points in time, i.e. when code-coverage was base-lined. Second, when it is being compared to current build and being merged. Also consider things like code-refactor cannot be determined, if class or package is refactored the code-coverage will be marked as zero. With respect to FIG. 2a and FIG. 2b, the first step of the algorithm comprises: opening the stream to base-line xml coverage with variable BLX (Baslined XML Coverage Result), opening the stream to current xml with variable CX (Current XML Coverage Result) and Initializing a stream, where one needs to write final merged XML results (201). Second step comprises: Iterating through all packages in both BLX CX. If package exists in BLX and not in CX, then whole package is deleted, and hence the old code coverage is irrelevant in final output, as the code does not exist at all and skip the package. Similarly, if package exists in CX and not in BLX then package is newly added code. If there is any coverage that took place it is only as part of current and takes the whole package as in CX (202). Third step comprises: If package exists in CX and BLX both then handle package (203) (again note here classes are stored in alphabetical order. So it is possible to merge one-by-one), iterate through each class within the package (204). With respect to third step if package exists in CX and BLX both and for handling class merging, if class exists in BLX and not in CX then (the class does not exist currently, so the code-coverage is lost, and need not be included in the final report) skip, do not merge this in final result. If class exists in CX and not in BLX then (the class is in current, and not in base-lined, it means that the class is a newly added class), merge the coverage as it is in the current state, else initialize the NewLineFinder (Utility that fetches the new line number, given the old file/new file text) [Old Source Path, New Source Path], iterate through methods within the class (205). With respect to third step for handle methods, if method exists in BLX and not in CX then (the method does not exist currently, so the code-coverage is lost as per current state, and need not be merged in final report) skip, do not merge this in final result, else if method exists in CX and not in BLX then (the method did not exist previously), merge the coverage as it is in the current state, else take each line find its <newLineNumber> using the LineFinderUtility (means it does not exist in new Code)

```
if <new LinNumber> returned is -1
    Don't merge it in new RX (Result XML)
else if <newLineNumber> is nonZero
```

Take lineNumber element from CX and sum-up the values for total coverage for that line. Now, take all newLinNumbers, which are not already merged, and merge them as is in RX (206). With respect to third step for handle lines report, repeat in step previous step (With respect to third step for handle methods) for all linenumbers within the <lines> tag as well (207).

According to one embodiment herein, the method further comprises a three way merge of code coverage result in context of source code evolution. The three way merge of code coverage result is as follows;

```
Get the patch information from Diff utility between 2 files
    for (Delta delta: patch.getDeltas( )) { isCodeChange = true;
        int revisedPos = delta.getRevised( ).getPosition( );
        int revisedSize = delta.getRevised( ).size( );
        List<?> revisedLines = delta.getRevised( ).getLines( );
        int originalSize = delta.getOriginal( ).size( );
        List<?> originalLines = delta.getOriginal( ).getLines( );
        If (revisedPos>=newLineCurr){int i=newLineCurr;
            for (;i<=revisedPos;i++){ setSimilarLineNumbers( );}}
            if (revised Size<original Size){int cnt=0; for (Object line : original Lines {if (revised
Size > cnt && line.toString( ).trim ( ).equals (revised Lines. Get (cnt). To String ( ). trim ( )))
{set Similar Line Numbers( );}
                else {if (revised Size>cnt) {set Insert Line Numbers( );} set Delete Line Numbers( );}
cnt++;}}
            orelse if (revised Size > original Size) {int cnt=0; for (Object line : revised Lines)
{if(original Size > cnt && line. to String ( ).trim ( ). Equals (original Lines. Get (cnt).to
String ( ).trim ( ))) {set Similar Line Numbers ( );}
                else{setInsertLineNumbers( );if(originalSize>cnt){setDeleteLineNumbers( );}}cnt++;}}
        else{int cnt=0; for(Object line : revised Lines) {if (line.toString( ).trim( ). Equals (original
Lines. get(cnt).to String( ). trim( ))) {set Similar Line Numbers( );} else{ set Insert Line
Numbers ( ); set Delete Line Numbers( );} cnt++;}}}
Wherein:
    Set Similar Line Numbers - it just puts the map based on current new line point and
    old Line pointer, and increments both line numbers.
    Set Insert Line Numbers - it just puts the -1 in old current in new, increments current
    line number.
    Set Delete Line Numbers - it just puts the -1 in new current Old Pointer in old,
    increments current Old Line number
```

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications.

It is also to be understood that the following claims are intended to cover all of the generic and specific features of the embodiments described herein and all the statements of the scope of the embodiments which as a matter of language might be said to fall there between.

What is claimed is:

1. A computer implemented method for merging results from multiple runs based on run inputs in a source computing system, the method comprises:

performing a first run on a first input to receive a first result, and wherein, the first run is performed by carrying out a static analysis on the first inputs;

performing a second run on a second input to receive a second result and wherein the second run is performed by carrying out a static analysis on the second inputs;

aggregating the first result and second result based on a set of rules and a plurality of merge cases or conditions to obtain a final result;

wherein the aggregate merge result of a plurality of runs is a sum of a plurality of individual run results of the plurality of runs, when a set of variables in a plurality of inputs do not overlap with one another, and wherein the aggregate merge result of a plurality of runs is acquired based on a plurality of merge rules, when a set of variables in a plurality of inputs are mutually different;

wherein the aggregate merge result is obtained by deleting a line that is not covered in both the first run and the second, run and by covering all other lines, when a line is present and covered in the first run and the same line is deleted in the second run and is not covered in the second run.

2. The method according to claim 1, wherein the first input, and the second input are selected from a group consisting of class, code, branch and line.

3. The method according to claim 1, wherein the first input and the second input comprises a set of variables.

4. The method according to claim 1, wherein the set of variables in the first input and the set of variables in the second input, overlap with each other.

5. The method according to claim wherein the set of variables in the first input and the set of variables in the second input are mutually different.

6. The method according to claim 1, wherein the aggregate merge result is obtained by summing up a line hit or coverage in a merge report, when a line is covered in both in the first run and in the second run.

7. The method according to claim 1, wherein the aggregate merge result is obtained by covering a line in the merge report, when a line is covered in the first run and the same line is not covered in second run.

8. The method according to claim 1, wherein the aggregate merge result is obtained by merging the results of the first run and the result of the second rim when a branch is hit in the first run and in the second run in mutually different cases.

9. A computer implemented method for merging a code coverage and a source code in a computing system, the method comprising the steps of:

collecting a class code of coverage run one;

collecting a class code of coverage run second;

comparing the class code of coverage run one and the class code of coverage run second to check whether a code is changed for the current class for run one and run second;

computing a difference of code, when a code is changed;

mapping an old tine number to a new line number, or else passing the old line number and new line number directly to a merge algorithm; and merging line and branch coverage information, and wherein the merging of line and branch coverage information comprises summing up old code line hits and new code line hits and checking whether either one of an old code line/branch or a new code line covered in testing and then marking a code line as covered;

wherein the aggregate merge result is obtained by deleting a line that is not covered in both the first run and the second, run and by covering all other lines, when a line is present and covered in the first run and the same line is deleted in the second run and is not covered in the second run.

10. A computer storage medium recorded with instructions that are run on a processor of computing device to perform a method for merging results from multiple runs based on run inputs in a source computing system, the method comprising the steps of:

performing a first run oil a first input to receive a first result and wherein the first run is performed by carrying out a static analysis on the first inputs;

performing a second run on a second input to receive a second result and wherein the second run is performed by carrying out a static analysis on the second inputs;

aggregating the first result and second result based on a set of rules and a plurality of merge cases or condition to obtain a final results;

wherein the aggregate merge results of a plurality of run is a sum of a plurality of individual run results of the plurality of runs, when a set of variables in a plurality of inputs do not overlap with one another and wherein the aggregate merge result of a plurality of runs is acquired based on an plurality of merge rules when a set of a variables in a plurality of inputs are mutually different;

wherein the aggregate merge result is obtained by deleting a line that is not covered in both the first run and the second, run and by covering all other lines, when a line is present and covered in the first run and the same line is deleted in the second run and is not covered in the second run.

11. The method according to claim 10, wherein the first input and the second input are selected from a group consisting of class, code, branch and line.

12. The method according to claim 10, wherein the first input and the second input comprises a set of variables.

13. The method according to claim 10, wherein the Set of Variables in the first input and the set of variables in the second input overlap with each other.

14. The method according to claim 10, wherein the set of variables in the first input and the set of variables in the second input are mutually different.

* * * * *